United States Patent [19]

Zeilon

[11] 4,048,810
[45] Sept. 20, 1977

[54] REFRIGERATING PROCESS AND APPARATUS THEREFOR

[76] Inventor: Sten Olof Zeilon, Heimdalsgatan 21, 260 14 Glumslov, Sweden

[21] Appl. No.: 678,489

[22] Filed: Apr. 20, 1976

[30] Foreign Application Priority Data

Apr. 28, 1975 Sweden .................................. 7504890

[51] Int. Cl.² ............................................. F25B 15/00
[52] U.S. Cl. ......................................... 62/101; 62/476
[58] Field of Search .................. 62/101, 103, 104, 476

[56] References Cited

U.S. PATENT DOCUMENTS

| | | | |
|---|---|---|---|
| 1,925,361 | 9/1933 | Altenkirch | 62/103 |
| 2,307,380 | 1/1943 | Baker | 62/101 |
| 3,330,126 | 7/1967 | Russell | 62/101 |
| 3,456,454 | 7/1969 | Kantor | 62/101 |

*Primary Examiner*—Lloyd L. King
*Attorney, Agent, or Firm*—Holman & Stern

[57] ABSTRACT

This invention relates to a refrigerating process according to the known compression-absorption method, in which a solution of gas in a liquid absorbent is conducted in a closed cycle from an absorber to an evaporator in which by heat supply thereto a certain amount of gas is expelled from the absorbent and from which the solution having a lower gas concentration and, after compression, the expelled gas are separately recycled to the absorber in which by removal of heat from the solution the recycled gas is again dissolved in the absorbent for restoration of the gas concentration of the solution which is then transferred to the evaporator, and the invention is characterized in that the evaporation of gas from, and the absorption of gas in, the absorbent is continuously effected in the solution along an elongated chamber where a substantial temperature gradient from one end to the other end of the chamber is maintained whereby the compression-absorption process may be effected at a relatively low compression ratio.

19 Claims, 5 Drawing Figures

REFRIGERATING PROCESS AND APPARATUS THEREFOR

This invention generally relates to a refrigerating process and an apparatus for carrying the process into effect. More particularly, the invention relates to a refrigerating process utilizing a refrigerant system in which gas is dissolved in a liquid according to the compression-absorption method.

In compression-adsorption refrigerating machines it is known to utilize a refrigerant and an adsorbent of different densities, for instance ammonia and water, respectively, or some other adsorbent such as mineral oil, paraffin oil, a mixture of mineral and paraffin oils etc. German Auslegeschrift 1,125,956 describes a refrigerating machine having an adsorption vessel in which such pressure and temperature conditions are maintained that ammonia is dissolved in a gaseous state in the absorbent. The solution thus produced is passed through a heat exchanger in which the mixture is cooled down, the intention being to bring about a condition in which ammonia tends to be separated as liquid in the absorbent. From the cooler the solution is led to an expulsion vessel in which further cooling is realized to precipitate ammonia in the form of liquid droplets in the absorbent, thereby to separate liquid ammonia from liquid absorbent by making use of a "miscibility gap" at a certain temperature and the different densities of the refrigerant and the absorbent. From the lower portion of the expulsion vessel the cooled absorbent is pumped back to the absorption vessel via the heat exchanger, while liquid ammonia is discharged at the top of the explusion vessel and led back to the absorption vessel through a separate conduit via an evaporator and a compressor. An evaporator for the refrigerating medium shall be disposed in the expulsion vessel for the cooling thereof. A separate refrigerating circuit containing a heat absorption medium is provided in the absorption vessel.

In this apparatus the refrigerant and the absorbent are thus passed together as a solution of vapour in liquid from the absorption vessel to the heat exchanger and from the latter to the expulsion device in which dissolved gaseous ammonia shall be separated from the absorption liquid by cooling. A difficulty encountered in practising this method resides int. al. in that the solubility of ammonia in liquid usually does not decrease but increases at sinking temperatures and unaltered pressures.

In said compression/absorption refrigerating machine the evaporator operates in a conventional manner with a simple refrigerating fluid (such as pure ammonia) after said refrigerating fluid has been separated from the absorbent in a separate vessel (the expulsion vessel).

The object of the present invention is to provide a process and an apparatus based upon the principle of conducting a solution of refrigerating and absorbing fluids in countercurrent to outer heat emitting and heat absorbing media in both the evaporator and the absorber. More particularly, the invention has for its object to combine the prior art compressor-absorption method and the likewise previously known heat exchange according to the countercurrent principle to provide in the solution in the evaporator and absorber, respectively, a state of equilibrium of the concentration and temperature of the solution, which continuously changes from one end of said evaporator and absorber, respectively, to the other end thereof, and thereby to obtain a considerably increased efficiency.

To this end, the invention provides a refrigerating process according to the compression-absorption method, in which a solution of gas in a liquid absorbent is conducted in a closed cycle from an absorber to an evaporator in which by heat supply thereto a certain amount of gas is expelled from the absorbent and from which the solution having a lower gas concentration and, after compression, the expelled gas are separately recycled to the absorber in which by removal of heat from the solution the recycled gas is again dissolved in the absorbent for restoration of the gas concentration of the solution which is then transferred to the evaporator. The steps characteristic of the process comprise continuously bringing about the evaporation of gas from, and the absorption of gas in, the absorbent along an elongated space for the solution in the evaporator and the absorber, respectively, by successively elevating and lowering, respectively, the temperature of the solution from the inlet to the outlet for the solution in the respective space.

For carrying the process according to the invention into effect a refrigerating apparatus has been developed which comprises an evaporator, an absorber, means for cycling a solution of gas in a liquid absorbing medium from the absorber to the evaporator and from the evaporator back to the absorber, and means for transferring gas expelled from the solution in the evaporator to the absorber to permit redissolution of the gas in the solution in the absorber, wherein both the evaporator and the absorber include a drum of substantially horizontal longitudinal axis, and drum having a metal jacket of good heat conductivity and adapted to be rotated about its horizontal longitudinal axis, each drum contains a gas and liquid permeable body arranged in heat conductive connection with the jacket of the drum and being of metal of good heat conductivity and large total surface, each drum being connected to said means for cycling the solution so that the solution is introduced at one end of the drum and discharged at the other end of the drum after it has flowed through the drum under expulsion of gas in the drum of the evaporator and absorption of gas in the drum of the absorber, and the apparatus includes means for realizing by means of a heat emitting medium a successive increase of the temperature of the solution from one end to the other of the drum of the evaporator, and means for realizing by means of a heat absorbing medium of successive temperature decrease of the solution in the drum of the absorber from one end of the drum to the other.

According to a brief summary of the invention, the process comprises conducting the solution of gas in the absorption liquid in countercurrent heat exchanging contact with outer heat emitting and heat absorbing media and exploiting the well-known property of the solution to permit within the same space (condensor or absorber) and under the same pressures different states of equilibrium of the concentration and temperature in the solution. Apart from evaporation heat the gas carries according to well-known compression-refrigerating technics also its heat of solution, which contributes to an increased efficiency. With the process of the invention it is possible to operate within relatively narrow pressure ranges, for instance 0.5 to 3.0 atmospheres, which reduces the compression work. Normally, lower pressures and temperature gradients require large inner heat transmission surfaces, but in practising the inventive process this difficulty can be overcome by the use of rotary contact surfaces between the heat absorbing and heat emitting media.

For better understanding, the invention will be more fully described hereinbelow with reference to the accompanying drawings in which.

Figure 1:
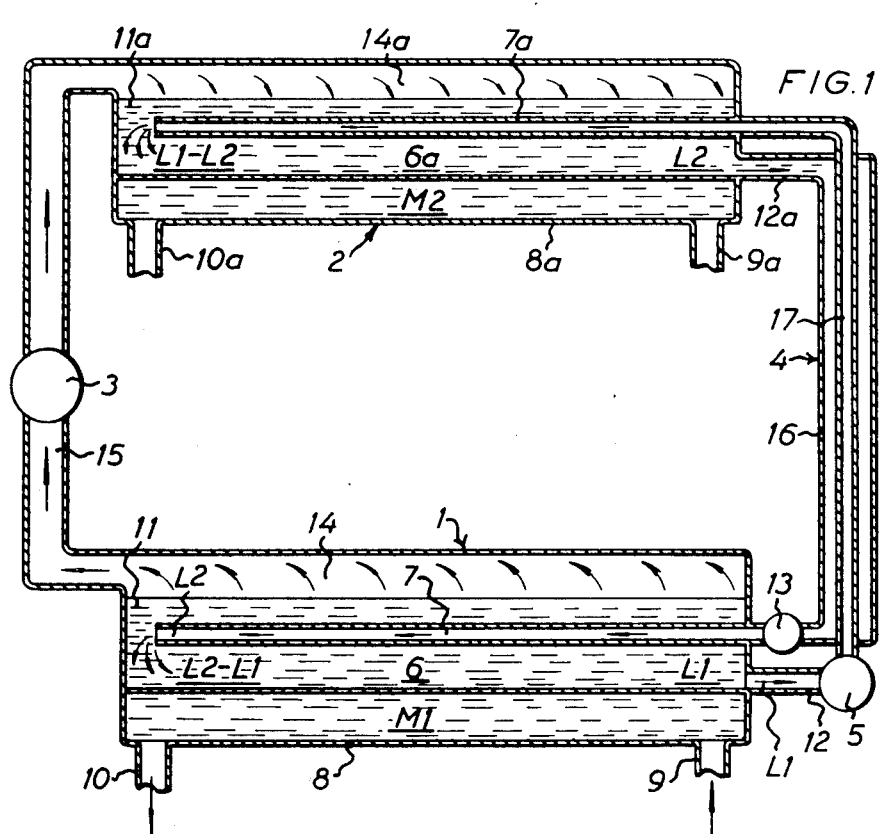
FIG. 1 is a very schematical axial sectional view of a refrigerating apparatus according to the invention which operates on the compression-absorption principle combined with the countercurrent principle.
Figure 2:
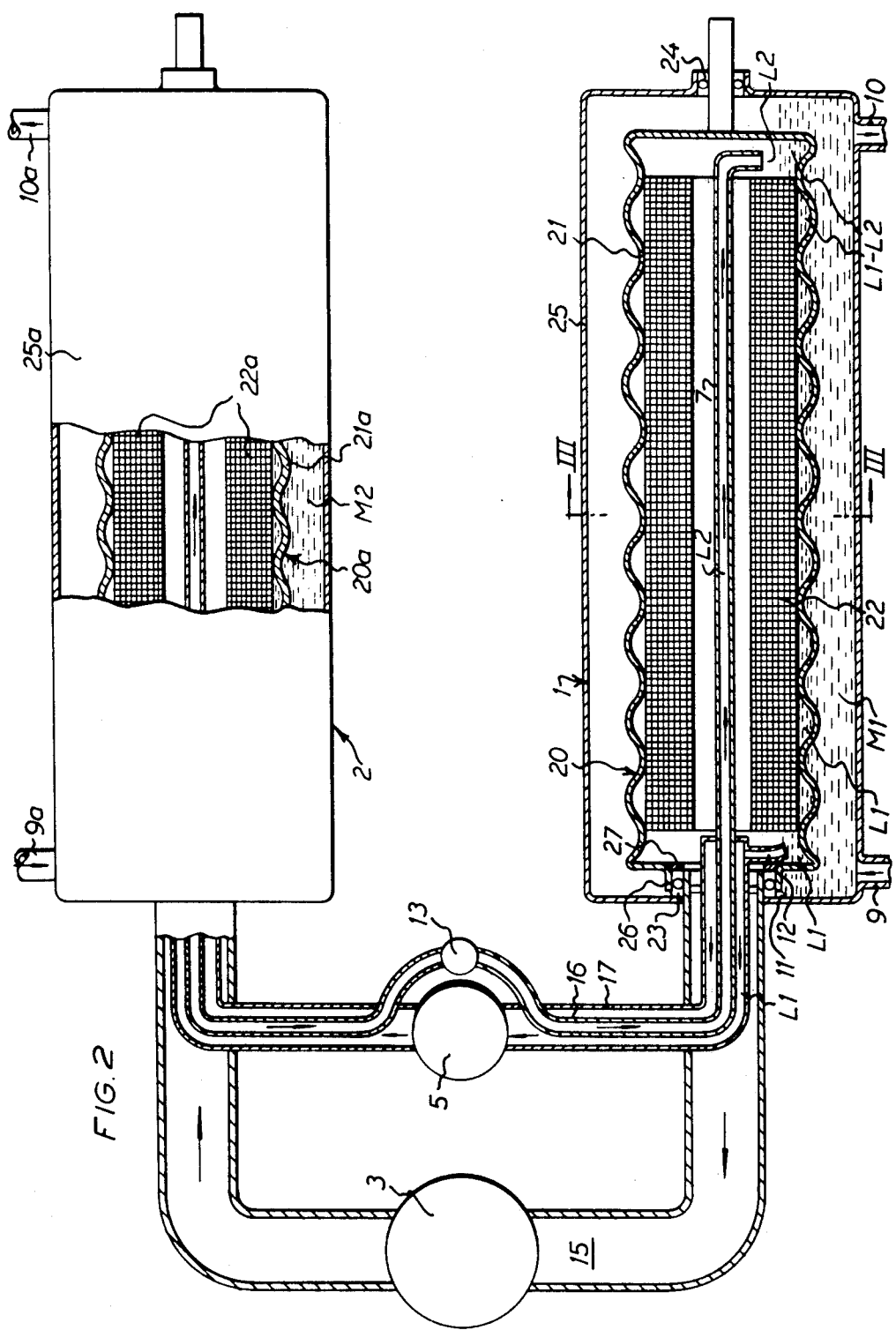
FIG. 2 is a schematical axial sectional view of a compact apparatus.
Figure 5:
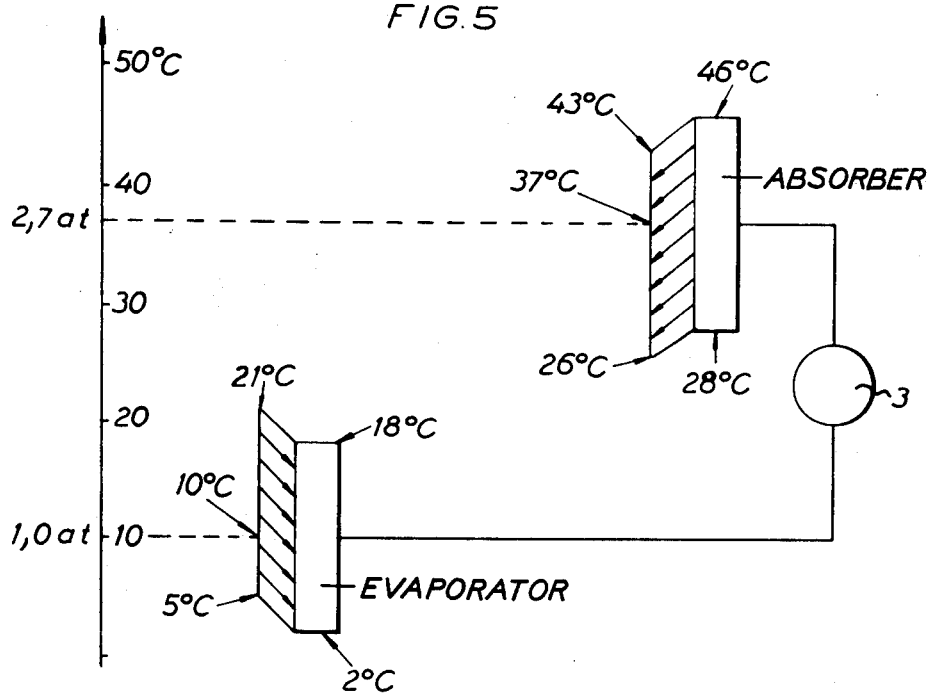

FIG. 5 graphically illustrates an example of the operating range in a conventional diagram for a water/ammonia mixture for the apparatus in FIGS. 1 and 2.

FIG. 1 illustrates a refrigerating process according to the invention in an optionally chosen operating range for the different conditions in different parts of the cycle for a refrigeration fluid and an absorption fluid consisting of ammonia and water.

The apparatus includes an evaporator 1 in the form of an elongated heat exchanger which has a horizontal longitudinal axis and operates on the countercurrent principle and through which flows an outer heat emitting medium M1, an absorber 2, likewise in the form of an elongated heat exchanger which operates on the countercurrent principle and has a horizontal longitudinal axis and through which flows an outer heat absorbing medium M2, a gas pump 3 sucking ammonia gas from the evaporator 1, compressing the gas and driving the gas to the absorber 2 for redissolution in water (the absorption fluid). Furthermore, the apparatus includes a heat exchanger 4 between the evaporator and the absorber 2 and a liquid pump 5 for pumping a solution L1 of ammonia in water through the heat exchanger 4 from the evaporator to the absorber.

The evaporator 1 and the absorber 2 can be structurally designed in basically the same manner. The embodiment of FIG. 1 is shown merely with the view to illustrating the principle of a refrigerating process according to the invention, but not to illustrate any special construction. It will therefore suffice to mention that the evaporator 1 comprises an elongated housing which has a horizontal longitudinal axis and a chamber 6 extending throughout the length of the housing. A conduit 7 one end of which opens into one end portion of the chamber 6, extends substantially centrally through the chamber and emerges from the housing at the opposite end of the chamber. The chamber 6 is surrounded at least partially by a space 8 for the outer heat absorbing medium M1, the inlet and the outlet of said space being designated 9 and 10, respectively. The chamber 6 contains up to a certain level 11 said solution of ammonia in water, which is designated L1. At one lower end of the chamber is provided an outlet 12 which leads to the pump 5, and a controllable throttle valve 13 is connected in the conduit 7 between the heat exchanger 4 and the evaporator 1. A space 14 in the upper part of the chamber above the liquid level 11 is connected via a conduit 15 in which the gas pump 3 operates to a corresponding space 14a in the absorber 2 which — are already mentioned — in the case illustrated (FIG. 1) is of substantially the same construction as the evaporator 1. Details of the construction of the absorber 2 therefore carry the same reference numerals as the corresponding details of the evaporator, with the addition of the letter a.

FIG. 1 shows the heat exchanger between the evaporator 1 and the absorber 2 in the form of an outer tube 16 and an inner tube 17 extending through said outer tube 16. The inner tube 17 is connected at its lower end to the pump 5 and at its upper end to the conduit 7a, while the tube 16 is connected at its lower end to the conduit 7 and at its upper end to the outlet 12a of the absorber chamber 6a.

The apparatus operates as follows:

Continuously released ammonia gas is sucked by the gas pump 3 from the gas chamber 14 in the evaporator 1 and is compressed to a certain pressure and introduced into the gas space 14a in the absorber 1, the ammonia gas being dissolved in the solution of ammonia in water in the absorber chamber 6a. In operation, this solution is maintained in constant circulation between the absorber 2 and the evaporator 1. By reason of the pressure difference between the absorber 2 and the evaporator 1 realized by the gas pump 3, the solution of ammonia in water is transferred from the absorber chamber 6a via the heat exchanger 4 and introduced into the chamber 6 of the evaporator 1 through the conduit 7 so that the solution issues into said evaporator chamber 6 at the left end thereof. From the evaporator 1 the solution is pumped back to the absorber 2 by means of the pump 5 via the heat exchanger 4 and is introduced at the left end of the absorber chamber 6a through the conduit 7a. While moving from left to right in the absorber chamber 6a the solution which may be designated L2 is continuously cooled by means of the heat absorbing medium M2, and simultaneously ammonia gas is dissolved in the solution L2 whose concentration of ammonia gas continuously increases in the solution L1 from the left to the right end of the chamber 6a. The opposite procedure takes place in the evaporator 1, that is, the solution L1 in the chamber 6 is successively heated as it flows from the left to the right end of the chamber 6 by heat exchange with the medium M1, and at the same time ever more ammonia gas (as viewed from the left to the right end of the chamber 6) escapes from the solution and is sucked out of the gas space 14. The temperature of the solution L1 thus preferably linearly increases as seen from the left to the right end of the chamber 6, simultaneously as the ammonia concentration linearly decreases, while in the absorber chamber 6a (as viewed from the left to the right) the temperature of the solution L2 sinks and the ammonia concentration linearly increases.

Both in the evaporator 1 and the absorber 2 there prevails a continuously changing state of equilibrium of the concentration and temperature of the solution L1 and L2, respectively, from one to the other end. Thus no temperature jump occurs and the ammonia gas is uniformly expelled and redissolved, respectively, along the gas and solution interfaces. The heat exchange between different media, that is, between the solutions L1 and L2 in the evaporator 1, in the absorber 2 and in the outer heat exchanger 4 as well as between said solutions L1, L2 and the respective heat emitting and heat absorbing media M1, M2 takes place in each section of the circulation system on the countercurrent principle.

Figure 4:
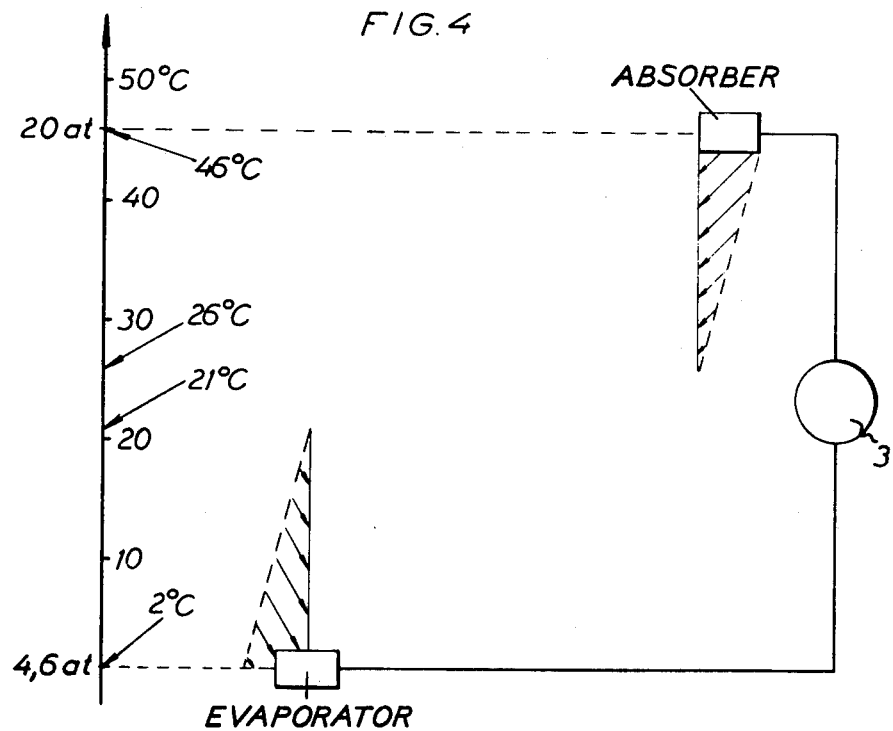
FIG. 4 is a view graphically illustrating the different operating principles of a conventional compression-absorption refrigerating machine and an apparatus according to the present invention.

It will appear from the foregoing that the temperature gradients are relatively small throughout the evaporator 1 and the absorber 2. Compared to a normal refrigerating process by means of an ammonia-water system in which both the absorber and the evaporator operate with the maximum temperature gradient, that is, the temperature jump between the highest and lowest temperatures in the respective unit, the system according to the present invention operates with temperature gradients that can be considered as the mean value of the highest and the lowest temperature, respectively, in the respective unit. This is graphically illustrated in FIG. 4 where the upper diagram shows a conventional refrigerating process with a minimum temperature of +2° C and a maximum temperature of +46° C for the cycling solution of ammonia in water with the prevailing relatively large temperature gradients and the high compression work. It appears from the lower diagram representing the refrigerating process according to the invention that the temperature gradients over the heat exchanging surfaces are lower and also the compression work, which however, requires larger heat transmitting surfaces.

In a typical case of a refrigerating process according to the invention the temperature, in different parts of the system, of the heat exchanging media M1 and M2 and the solution L1 and L2 as well as the ammonia concentrations of the solutions can be as follows:
Temperature of medium M1 at inlet 9 abt. +21° C
Temperature of medium M1 at outlet 10 abt. + 5° C
Temperature of medium M2 at outlet 9a abt. +25° C
Temperature of medium M2 at outlet 10a abt. +43° C

| Temperatures and ammonia concentrations of solutions L1 and L2: | | |
|---|---|---|
| | L1 | L2 |
| at the left end of the evaporator 1 | + 2° C, 45% | + 2° C, 45% |
| at the right end of the evaporator 1 | +18° C, 35% | +18° C, 45% |
| at the right end of the absorber 2 | +26° C, 35% | +28 ° C, 45% |
| at the left end of the absorber 2 | +46° C, 35% | +46° C, 35% |

The pressure in the absorber 2 can be considered equal to the compression pressure, which in the case illustrated is assumed to be 2.7 atmospheres. The pressure in the evaporator 1, which is likewise maintained by means of the gas pump 3, is 1 atmosphere.

As a practical example of comparison it may be mentioned that with the above values of heat in different parts of the system it is possible to obtain at a compression ratio of but 2.7 atmospheres a refrigeration of 380 kcal/kg H₃N in the process according to the invention, whereas a conventional refrigerating process (pure ammonia process) which as in the above described example operates between minimum and maximum temperatures of +2° C and +45° C, respectively (see the upper diagram in FIG. 4), requires a considerably higher compression ratio, say about 4.2, which means a greater span between maximum and minimum pressures (e.g. 20 atm. and 4.6 atm., respectively) and gives a lower refrigeration, say 300 kcal/kg H₃N. At heat reflux in the outer heat exchanger 4 of 20 kcal/kg H₃N the compression in the process according to the invention is reduced relative to the above-described conventional process by

300/360 · 2.7/4.2 = 0.55.

The improved coefficient of performance, however, is gained at the cost of increased heat exchanging surfaces since the temperature gradient is small throughout the evaporator and the abosrber. But as long as the media M1 and M2 are liquids, the resulting drawback is insignificant because of high coefficients of thermal transmittance of the heat exchanging surfaces.

The realization of the process in practice is dependent on how close to the states of equilibrium the process is performed, that is, in other words how large the contact surface is between the gas and the solution and how efficiently the evaporation heat is supplied to, and the heat of solution is removed from, the solution.

Figure 3:
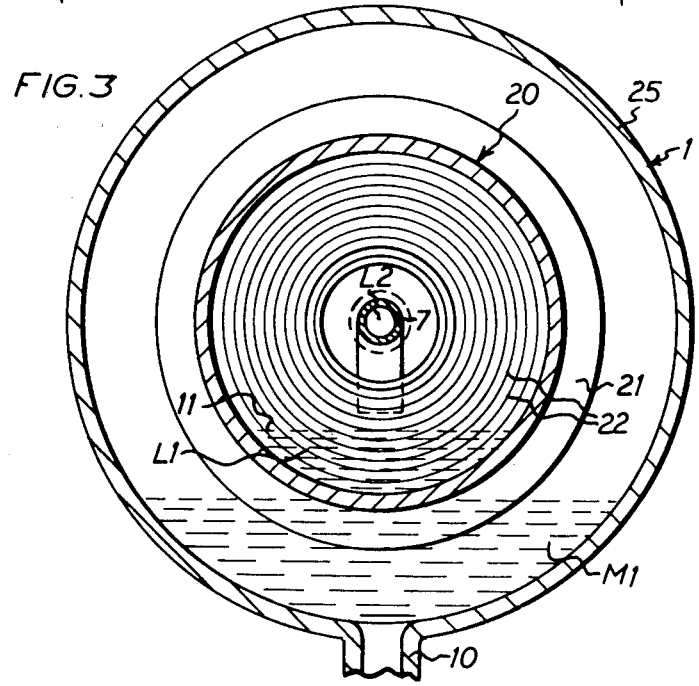
FIG. 3 is a schematical cross sectional view taken on line III—III in FIG. 2.

To satisfy the requirements for effective heat exchanging surfaces for the evaporator 1 and the absorber 2 in the simplest way, use can be made of a construction of the kind schematically shown in FIGS. 2 and 3, in which both the evaporator and the absorber are of the rotary type.

As far as feasible the same reference numerals are utilized for the apparatus in FIGS. 2 and 3 as those for equivalent parts in FIG. 1, and since these parts have already been described with reference to FIG. 1, only the elements peculiar to the construction in FIGS. 2 and 3 will now need to be described. These elements are the inner elements of the evaporator 1 and the absorber 2. Also in the embodiment shown in FIGS. 2 and 3 the evaporator 1 and the absorber 2 are substantially of the same construction, for which reason only the evaporator 1 will be described in detail hereinbelow.

In the embodiment shown in FIGS. 2 and 3 the evaporator comprises a drum 20 which has a corrugated jacket 21 and contains a body 22 in the form of a hollow cylinder. The body 22 consists of a fine-mesh metal network, such as spirally wound metal wire netting or thin punched plates of expanded metal.

The drum 20 is rotatably mounted in bearings 23, 24 in a housing 25 embracing the drum and can be rotated by a suitable drive (now shown). The outer housing 25 delimits a space corresponding to the space 8 in FIG. 1 for the heat emitting medium M1 and is provided with an inlet 9 and an outlet 10 at the opposite ends. The two conduits 16, 17 of the outer heat exchanger 4 for the solutions L1 and L2, respectively, are connected to the interior of the drum 20 in substantially the same manner as the corresponding conduits are connected to the evaporator 1 in FIG. 1, but there is a certain difference owing to the fact that the drum 20 is rotated in operation. The conduits 15, 16, 17 like the pipe 7 extending axially through the drum 20 can be stationary. The inlet of the gas pipe 15 into the housing 25 is arranged in a hollow journal 26 at one end of the housing 25. The hollow journal 26 in mounted in a bearing 23 on the end portion of the pipe 15, said end portion being sealed relative to the housing 25, the journal 26 and the pipe 7 whose outlet 12 opens into the solution L1 in the drum 20. In this construction the outlet end of the gas pipe 15 thus forms a stationary part on which the drum 20 is mounted in the bearing 23 via a hollow journal 26 connected to the end wall of the drum and in relation to which the drum is sealed by a gasket 27. The gas pipe 15 opens into the left end of the drum 20. The outer pipe of the heat exchanger here is the pipe 17 forming a conduit for the solution L1 while the inner pipe 16 forms a conduit for the solution L2. The outer pipe 17 extends into the gas pipe 15 and continues intothe drum 20 where the outer pipe 17 is sealed at the end relative to the inner pipe 7 and has a downwardly directed outlet 12. The inner pipe 7 continues to the right end of the drum for supplying the solution L2 in the same way as in FIG. 1.

In the construction described above there is only required a seal between the rotary drum 20 and the stationary gas pipe 15 since the conduits 16, 17 are drawn into the gas conduit and from said conduit extend into the drum 20.

Upon rotation of the drum 20 the corrugated jacket 21 thereof is in good heat exchanging contact with the medium M1 in the housing 25. The medium M1 (liquid) can reach up to a certain level, for instance the bearing 23. During the rotation of the drum the network material 22 is constantly moistened by the solution L1, and the ammonia gas escaping from the solution is sucked out through the network into the gas pipe 15 while the solution L1 at the left end of the drum 20 in FIG. 2 is sucked out by means of the liquid pump 5.

The absorber 20 being of the same construction as the evaporator 1, it will not be necessary to describe the absorber in detail. The various elements of the absorber have been given the same reference numerals as those of the evaporator, with addition of the letter a.

In the embodiment illustrated in FIGS. 2 and 3 the drum 20 of the evaporator 1 as well as the drum 20a of the absorber 2 is designed as a single-jacketed cylinder. The drum can, however, be provided with double jackets and can be supplemented in a simple way for heat exchange by means of air.

The heating of the medium M2 brought about by the refrigerating process can be exploited for useful purposes, but the main object is to exploit the medium M1 excaping from the evaporator 1 for cooling purposes either directly or via outer heat exchangers.

As for the construction of the apparatus the invention is not limited to the embodiments described above but can modified in different ways within the spirit and scope of the appended claims.

Instead of an ammonia-water system use can of course be made of another system, such as a well-known ammonia-hydrocarbon system.

What I claim and desire to secure by Letters Patent is:

1. A refrigerating process according to the compression-absorption method in which use is made of apparatus comprising a gas evaporator and a gas absorber connected to each other by gas and solution circuit means in a closed system, comprising the steps of (a) feeding in a closed cycle a solution enriched by gas from the absorber (2) to the evaporator (1); (b) supplying heat to said enriched solution in the evaporator for evaporating gas therefrom and producing a gas impoverished solution; (c) feeding said enriched solution to the evaporator; (d) withdrawing evaporated gas from the evaporator and increasing the pressure thereof; (e) introducing said pressure increased gas into the absorber and removing heat from said gas impoverished solution introduced into the absorber under conditions which will ensure therein a higher pressure level than in the evaporator and a lower average temperature of the impoverished solution introduced thereinto than the average temperature of the enriched solution introduced into the evaporator for effecting gas dissolution in the former and gas evaporation from the latter solution, respectively; (f) effecting increase of the temperature of the enriched solution which is fed from the absorber and is introduced into the evaporator and a proportional increase of the temperature of the impoverished solution which is fed from the evaporator and introduced into the absorber by leading said solutions in countercurrent heat exchanging relationship before admixing the enriched solution with solution which is under gas evaporating conditions in the evaporator and admixing of the impoverished solution with the solution which is under gas absorbing conditions in the absorber.

2. The process of claim 1, further comprising the steps of establishing said lower average temperature level of the solution in the evaporator by leading the solution from which gas is evaporated in countercurrent heat exchange with a heat emitting medium (M1), the temperature of which thereby being successively lowered, and establishing said higher average temperature level of the solution in the evaporator by leading the solution in which gas is absorbed in countercurrent heat exchange with a heat absorbing medium.

3. The process of claim 1, further comprising the steps of further increasing the temperature of said enriched solution introduced into the evaporator by leading that solution in heat exchange with a heat absorbing medium for successively decreasing the temperature of said enriched solution, and simultaneously establishing said lower average temperature level of the solution, which is to be fed as impoverished solution to the absorber, by leading the latter in countercurrent heat exchange with said medium as well as with said solution, from which gas is evaporated, and further decreasing the temperature of the impoverished solution in heat exchange with a heat absorbing medium and, simultaneously, in countercurrent heat exchange with solution in the absorber, in which gas is absorbed.

4. The process of claim 3, wherein said countercurrent heat exchange with said heat emitting medium is carried out at least substantially during displacement of the solution from which gas is evaporated, along an enclosed environment of substantial length in the absorber.

5. The process of claim 3, wherein said countercurrent heat exchange with said heat absorbing medium is carried out at least substantially during displacement of the solution, in which gas is absorbed, along an enclosed environment of substantial length in the absorber.

6. The process of claim 1, wherein said heat exchange between said enriched and impoverished solutions is at least partially carried out during feeding the enriched solution from the absorber to the evaporator and feeding the impoverished solution from the evaporator to the absorber for preheating of the former and for precooling of the latter solution.

7. The process of claim 2, wherein heat absorbing surfaces in at least either of the evaporator and absorber are rotated in contact with the respective medium and solution therein for enhancing the heat exchange therebetween.

8. A refrigerating process according to the compression-absorption method comprising the combination of the following steps:
   a. providing first and second enclosure means (1, 2);
   b. providing in each of said enclosure means fluid inlet (7, 7a) and outlet (12, 12a) means;
   c. providing in said first and second enclosure means gas inlet and gas outlet means (14, 14a), respectively, and connecting said gas inlet and outlet means by gas flow conduit means (15);

d. connecting said fluid outlet means (12a) of said first enclosure means (1) by first conduit (16) to said inlet means of said second enclosure means (2);

e. connecting said fluid inlet means (7a) of said first enclosure means (1) by second conduit means (17) to said fluid outlet means (12) of said second enclosure means (2) and providing said second conduit means (17) with means (5) for feeding fluid therethrough from said second to said first enclosure means;

f. providing, in the system formed by said first and second enclosure means and said first and second conduit means, a liquid fluid and a gaseous fluid able to be absorbed in a substantial amount by said liquid fluid at relatively low temperature and increased pressure and also able to be at least partially evaporated from said liquid fluid at relatively increased temperature and decreased pressure, for forming said system a solution of gas in said liquid fluid;

g. providing means for increasing the temperature of said solution in said first enclosure means (1) for effecting evaporation of gas from and thereby decreasing the gas content of the solution housed therein to provide an impoverished solution;

h. continuously evacuating the evaporated gas from said first enclosure means (1) for establishing said relatively decreased pressure therein, and delivering, via said gas conduit means (15), said gas at an increased pressure into said second enclosure means under conditions which will ensure a good contact between gas and solution and establish said increased pressure to force the solution therein to absorb the introduced gas, and simultaneously withdrawing heat from the solution in said second enclosure means (2) for lowering the temperature therein and thereby accelerating the absorption of said gas into the last mentioned solution for increasing the gas content thereof and forming an enriched solution;

i. continuously and separately displacing said enriched solution from said second enclosure means (2) and delivering that enriched solution to said first enclosure means (1) through said conduit means (16) which connects the outlet (12a) of the former (2) with the inlet (7) of the latter enclosure means (1) and continuously and separately displacing said impoverished solution from said first enclosure means (1) in spaced relation but in countercurrent heat exchanging relation to said enriched solution;

j. said temperature increasing and said temperature decreasing of said enriched and impoverished solutions, respectively, being partially effected by leading said enriched and impoverished solutions in spaced flows but in countercurrent heat exchanging relation before said impoverished solution is permitted to be admixed with said enriched solution in said second enclosure means (2) and before said enriched solution is permitted to be admixed with said impoverished solution in said first enclosure means (1).

9. A refrigerating apparatus comprising:

a liquid fluid;

a gas, said gas being able to be absorbed in a substantial amount by said liquid fluid at relatively low temperature and increased pressure and also able to be at least partially evaporated from said liquid fluid at relatively increased temperature and decreased pressure thereby forming an enriched solution and an impoverished solution respectively, first and second enclosure means said enclosure means contaning both said liquid fluid and said gas;

first fluid inlet and outlet means on said first enclosure means;

second fluid inlet and outlet means on said second enclosure means;

gas inlet means in said first enclosure means;

gas outlet means in said second enclosure means;

gas flow conduit means interconnecting said gas outlet means with said gas inlet means;

a first conduit interconnecting said first fluid outlet means with said second fluid inlet means;

a second conduit interconnecting said second fluid outlet means to said first fluid inlet means;

a fluid pumping means interposed in said second conduit for pumping said liquid fluid from said first enclosure means to said second enclosure means;

means for increasing the temperature of the solution in said second enclosure means for evaporating said gas from said liquid fluid;

gas transferring means interposed in said gas flow conduit means for pumping said gas from said first enclosure means to said second enclosure means; and means for decreasing the temperature in said second enclosure means;

said first conduit and said second conduit being in countercurrent flow heat exchanging relationship, said first fluid inlet means extending into and partially through said first enclosure means countercurrent to the fluid flow through said first enclosure means said second fluid inlet means extending into and partially through said second enclosure means countercurrent to the fluid flow through said second enclosure means.

10. The process of claim 1, characterised in that the pressure in the evaporator (1) is kept in the vicinity of or below atmospheric pressure.

11. The process of claim 1, characterised in that the absorbing medium is water and the gas is ammonia and that the solution thus is an ammonia-water solution.

12. The refrigerating apparatus of claim 9, wherein said first enclosure means is an evaporator; said second enclosure means is an absorber;

both said absorber and said evaporator each comprising:

a drum having a horizontal, longitudinal axis and two ends, each drum being made of a metal having good heat conductivity and being rotatable about said axis, and a drum-shaped gas and liquid permeable body mounted inside of each drum, said bodies being made of a metal having good heat conductivity and large surface area, each body being in heat conductive connection with its respective drum; and said first fluid inlet means extending longitudinally through said drum of said evaporator discharging said enriched solution at the end of said drum opposite to the end of its entrance, said second fluid inlet means extending longitudinally through said drum of said absorber discharging said impoverished solution at the end of said drum opposite to the end of its entrance.

13. The apparatus of claim 12, characterised in that the gas and liquid permeable body (22, 22a) in the respective drum (20, 20a) comprises wire netting.

14. The apparatus of claim 12, characterised in that the gas and liquid permeable body (22, 22a) comprises thin plates of expanded metal with a plurality of holes punched therein.

15. The apparatus of claim 12, characterised in that the gas and liquid permeable body (22, 22a) has a longitudinal central hollow space and said fluid inlet means extends through said hollow space 16. The apparatus according to claim 15, characterised in that said first conduit and said second conduit in the region between said two drums (20, 20a) comprise a heat exchanger (4) for countercurrent heat exchange between solutions respectively introduced into an recycled from each drum (20, 20a).

17. The apparatus of claim 16, characterised in that said gas outlet means, said first fluid inlet means, and said first fluid outlet means, and said gas inlet means, said second fluid inlet means and said second fluid outlet means are arranged in concentric relationship in the region of their connection with the evaporatio (1) and the absorber (2), respectively.

18. The apparatus of claim 12, characterised in that said fluid pumping means (20, 20a) comprises a liquid pump (5) for pumping solution from the drum (20) of the evaporator (1) to the drum (20a) of the absorber (2) and that the gas transferring means (3, 15) comprises a gas pump (3) for sucking gas from the drum (20) of the evaporator (1), for compressing said gas and for supplying said compressed gas to the drum (20a) of the absorber (2).

19. The apparatus of claim 12, characterised in that the drum (20) of the evaporator (1) comprises a gas collecting space which extends throughout the length of the drum and is connected to said gas transferring means (3, 15), said drum (20a) of said absorber having a gas receiving space which extends substantially throughout the length of the drum (20a) of the absorber (2) to permit gas absorption in said solution substantially throughout the length of said drum (20a).

* * * * *